United States Patent [19]

Libby

[11] 4,451,443
[45] May 29, 1984

[54] CAUSTICIZATION METHOD

[75] Inventor: Stephen C. Libby, Pittsburgh, Pa.

[73] Assignee: Aluminum Company of America, Pittsburgh, Pa.

[21] Appl. No.: 402,510

[22] Filed: Jul. 28, 1982

[51] Int. Cl.$^3$ .............................................. C01F 5/24
[52] U.S. Cl. ................................. 423/432; 423/175; 423/637
[58] Field of Search ................ 423/175, 177, 637, 432

[56] References Cited

U.S. PATENT DOCUMENTS

| | | | |
|---|---|---|---|
| 1,552,024 | 9/1925 | Alton | 423/432 |
| 1,588,253 | 6/1926 | Mathers et al. | 423/177 |
| 1,862,176 | 6/1932 | Church et al. | 423/432 |
| 2,282,584 | 5/1942 | Hill | 423/175 |

FOREIGN PATENT DOCUMENTS

| | | | |
|---|---|---|---|
| 1471109 | 11/1972 | Fed. Rep. of Germany | 423/175 |
| 50-159496 | 12/1975 | Japan | 423/175 |
| 767031 | 9/1980 | U.S.S.R. | 423/175 |

OTHER PUBLICATIONS

Boynton, *Chemistry and Technology of Lime and Limestone,* Interscience Publishers, (1966), pp. 153, 154.
Tokiti Noda, "Effect of the Addition of Common Salt During the Calcination of Limestone, VII", *J. Soc. of Chem. Industry,* Japan, Nov. 1937, (pp. 417–418).
Robert C. Young, "Chemistry of Bayer Liquor Causticization", *Light Metals,* 1982 AIME, Proceedings of 111th Annual Meeting, 1982, (pp. 97–117).

*Primary Examiner*—John Doll
*Assistant Examiner*—Wayne A. Langel
*Attorney, Agent, or Firm*—Brian D. Smith; Daniel A. Sullivan, Jr.

[57] ABSTRACT

A causticization method including the steps of calcining limestone in the presence of additive means for producing lime of increased lime efficiency relative to the lime that would result from calcining such limestone without the presence of the additive means, lime efficiency being determined on a sodium carbonate solution for which conditions, other than the character of the lime, are fixed, and subsequently feeding the lime of increased lime efficiency into the sodium carbonate solution for producing sodium hydroxide and calcium carbonate from the sodium carbonate.

5 Claims, No Drawings

CAUSTICIZATION METHOD

BACKGROUND OF THE INVENTION

The present invention relates to a causticization method wherein sodium carbonate solution is reacted with lime for producing sodium hydroxide and calcium carbonate.

SUMMARY OF THE INVENTION

An object of the invention is to provide new and improved process for causticizing sodium carbonate solution.

This as well as other objects which will become apparent from the description that follows are achieved according to the present invention by providing a causticization method including the steps of calcining limestone in the presence of additive means for producing lime of increased lime efficiency relative to the lime that would result from calcining such limestone without the presence of the additive means, the lime efficiency being determined on a sodium carbonate solution for which conditions, other than the character of the lime, are fixed, and subsequently feeding the lime of increased lime efficiency into the sodium carbonate solution for producing sodium hydroxide and calcium carbonate from the sodium carbonate.

"Lime efficiency" is the proportion of lime charged which forms calcium carbonate.

DESCRIPTION OF THE PREFERRED EMBODIMENTS

In the Bayer Process for the production of alumina from bauxite, large tonnages of quicklime (calcium oxide) or slaked lime (calcium hydroxide) are used for causticization of the Bayer liquors in order to regenerate caustic (NaOH) from $Na_2CO_3$.

Causticization can proceed by either of two over-all reactions, which differ in the chemical form of lime which reacts:

(1) $CaO(s) + Na_2CO_3(aq) + H_2O = 2NaOH(aq) + CaCO_3(s)$ (2) $Ca(OH)_2(s) + Na_2CO_3(aq) = NaOH(aq) + CaCO_3(s)$

Reaction (1) corresponds to the charging of dry lime, i.e. quicklime, while Reaction (2) is for the charging of lime which has been previously slaked, i.e. "pre-slaked" lime.

The present invention permits increasing the lime efficiency of a given lime by the addition of small amounts of alkali metal compound such as alkali metal salts, preferably in solution or slurry form, to the limestone ($CaCO_3$), prior to calcination to produce quicklime. Preferably, the alkali metal compound results in some liquid, i.e. molten, material being present on the limestone during calcination, the liquid being present in an amount effective for promoting the yield of lime of increased lime efficiency. The invention will be described using Bayer liquor (sodium aluminate solution) as a convenient source of dissolved alkali metal salt, but other alkali metal salts can be used as well, such as $Na_2CO_3$, NaCl, and $Na_2C_2O_4$.

The Bayer liquor is added to the limestone at a rate sufficient to add $Na_2O$ equivalent to 0.1 to 2.0 weight percent of the limestone weight. During pre-heating of the limestone prior to calcination, the salt solution is evaporated, leaving a residue of salts on the limestone. To effect calcination, the limestone is heated to bring about the change of $CaCO_3$ to CaO, with evolution of $CO_2$.

Tests of lime efficiency in causticization indicate that e.g. sodium compound addition in the limestone calcination step can improve the causticization behavior significantly. The improvement is measured by changes in the lime efficiency in causticization. As indicated above, lime efficiency is defined as the proportion of the total CaO charged for causticization which forms $CaCO_3$ rather than other reaction products such as $Ca(OH)_2$ or calcium aluminates.

Typical results of the tests using three different limestones are shown in Table I, where the limestones used were as follows: 410316B—Kimmswick Formation, Love Hollow Quarry, Batesville, Ark., coarse to very coarse-grained (i.e. 500 to 3,000 microns crystal diameter) limestone, 99% $CaCO_3$; 410147—Unnamed quarry near Cabo Rojo, Dominican Republic, very fine-grained (i.e. ½ to 5 microns crystal diameter) limestone, 97% $CaCO_3$; 410311C—Edwards Formation, Texas Crushed Stone Co. Quarry, Williamson County, Tex., medium-grained (i.e. 25 to 1,000 microns crystal diameter) limestone, 97% $CaCO_3$. The $Na_2O$ addition of Table I was added in the form of Bayer liquor, based upon proportion of contained $Na_2O$, and in order to give an example of how this is calculated, the 0.35% value was achieved as follows: Using Bayer liquor containing sodium at a level equivalent to 175 grams per liter (g/l), $$\frac{(0.02 \text{ liters liquor}) \times 175 \text{ grams } Na_2O \text{ per liter}}{1000 \text{ grams limestone}} =$$

$$3.5 \text{ g } Na_2O/\text{kg limestone} = 0.35\%.$$

In practice, the concentration of the liquor should be adjusted by dilution with water or more dilute liquor so that the ratio of liquor added to limestone is at least 0.25 liters/g limestone, to ensure that the alkali salts are well distributed in the limestone. The dilution calculation is as follows for the example above of 0.35% $Na_2O$ addition:

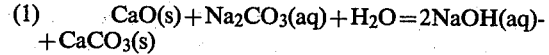

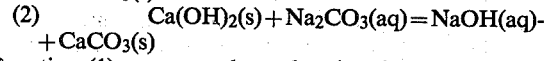

Therefore, for this example, 10 ml of liquor (175 g $Na_2O/l$) should be diluted with water to 125 ml to add 0.35% $Na_2O$ to the limestone, and to ensure complete wetting of the limestone for proper distribution of the alkali salts. The quicklime surface area is BET surface area determined on a Micromeritics Surface Area Analyzer. The slaking time of Table I was determined according to ASTM Standard Method C110-76a, Physical Testing of Quicklime, Hydrated Lime, and Limestone, Vol. 13, pages 69–86, Section 10. Calcination of the limestone was for two hours at 1,000° C.

TABLE I

Effect on Lime Efficiency of Addition of Sodium to Limestone Prior to Calcination

| Limestone | $Na_2O$ Addition (%) | Quicklime Surface Area ($m^2/g$) | Slaking Time (min) | Lime Efficiency (%) Pre-Slaked | Lime Efficiency (%) Dry Charged |
|---|---|---|---|---|---|
| 410316B | 0 | 2.0 | 1.5 | 54 | 44 |
|  | 0.35 | 0.5 | 24 | 64 | 65 |
| 410147 | 0 | 3.1 | 3.5 | 40 | 38 |
|  | 0.30 | 0.7 | 21 | 55 | 65 |
| 410311C | 0 | 2.8 | 2.5 | — | 42 |
|  | 0.73 | 0.7 | 30 | — | 73 |

Additional experimental conditions used in the tests of Table I are listed in Tables IIA and IIB, TC and TA being defined, respectively, as follows: TC is the total caustic (NaOH) content of the liquor, expressed as equivalent grams $Na_2CO_3$ per liter of solution; TA is the total alkali ($Na_2O$) content, also expressed as equivalent grams of $Na_2CO_3$ per liter of solution. Thus, TA includes both $Na_2O$ in caustic and $Na_2O$ in $Na_2CO_3$ in the liquors.

TABLE IIA

Experimental Conditions Used to Obtain the Pre-Slaked Lime for Charging in the Lime Efficiency Determinations of Table I

| | |
|---|---|
| Slaking Liquor | TA = 24 g/l |
| | TC = 16 g/l |
| | $Al_2O_3$ = 5 g/l |
| Quicklime Charge | 125 g/l solids |
| Quicklime Size | −100 mesh (Tyler) |
| Temperature | 90° C. |
| Reaction Time | 15 minutes |

TABLE IIB

Experimental Conditions Used in Causticization to Determine the Lime Efficiency of Table I

| | |
|---|---|
| Liquor | TA = 120 g/l |
| | TC = 84 g/l |
| | $Al_2O_3$ = 42 g/l |
| Initial TC/TA | 0.7 |
| Target TC/TA | 0.8 |
| Initial $Al_2O_3$/TC | 0.5 |
| Lime Charge | 33% of stoichiometric per Reaction (1) for "Dry Charged" and Reaction (2) for "Pre-Slaked" |
| Reaction Temperature | 90° C. |

TABLE IIB-continued

Experimental Conditions Used in Causticization to Determine the Lime Efficiency of Table I

| | |
|---|---|
| Reaction Time | 30 minutes |

The data of Table I show that lime efficiency can be increased by as much as 75% by appropriate addition of sodium salts to the limestone prior to calcination. It also shows that lime efficiency may be followed indirectly by measuring quicklime surface area or slaking rate. It is, however, prudent to be on guard for changes in the surface area empirical relationship to lime efficiency, or the slaking rate empirical relationship to the same, since the empirical relationships can change. The proportion of alkali metal compound or salts required to increase the lime efficiency of the product lime differs for each limestone, and must be determined empirically. The data in Table I show that lime efficiency can be increased for both methods of lime addition in causticizing—addition either as dry lime, i.e. quicklime, or as pre-slaked lime.

The result of this improvement in lime efficiency is a reduction in the tonnage of lime required to achieve a given degree of causticization or, conversely, increased causticization of the liquor without increasing the tonnage of lime used. A secondary benefit of decreasing the lime charging rate for causticization is a reduction in the tonnage of alumina lost due to formation of insoluble calcium-aluminates, since the amount of calcium aluminate formed during causticization is approximately proportional to the amount of lime charged.

What is claimed is:

1. The causticization method comprising the steps of calcining limestone in the presence of additive means for producing lime of increased lime efficiency relative to the lime that would result from calcining said limestone without the presence of said additive means, said additive means comprising an alkali metal compound, said lime efficiency being determined on a sodium carbonate solution for which conditions, other than the character of the lime, are fixed, and subsequently feeding the lime of increased lime efficiency into said sodium carbonate solution for producing sodium hydroxide and calcium carbonate from the sodium carbonate.

2. A method as claimed in claim 1, said alkali metal compound comprising a sodium compound.

3. A method as claimed in claim 1, the lime being added dry to the sodium carbonate solution.

4. A method as claimed in claim 1, the lime being added pre-slaked to the sodium carbonate solution.

5. A method as claimed in claim 1, molten material being present in the step of calcining in an amount effective for promoting the yield of said lime of increased lime efficiency.

* * * * *

UNITED STATES PATENT AND TRADEMARK OFFICE
CERTIFICATE OF CORRECTION

PATENT NO. : 4,451,443

DATED : May 29, 1984

INVENTOR(S) : Stephen C. Libby

It is certified that error appears in the above-identified patent and that said Letters Patent are hereby corrected as shown below:

Col. 2, line 44          Change "litres/g" to --litres/kg--.

Signed and Sealed this

Twenty-fifth Day of September 1984

[SEAL]

Attest:

GERALD J. MOSSINGHOFF

Attesting Officer          Commissioner of Patents and Trademarks